July 31, 1956

T. C. MASEL ET AL 2,756,691

RAILWAY VEHICLE TRUCK

Filed Jan. 12, 1953

INVENTORS
Theodore C. Masel
Joseph P. Miller
BY Willito, Helmig & Baillio
ATTORNEYS July 31, 1956  T. C. MASEL ET AL  2,756,691
RAILWAY VEHICLE TRUCK Filed Jan. 12, 1953  3 Sheets-Sheet 3

INVENTORS
Theodore C. Masel
Joseph P. Miller
BY Willits, Helmig & Baillio
ATTORNEYS

# United States Patent Office 2,756,691
Patented July 31, 1956

2,756,691

RAILWAY VEHICLE TRUCK

Theodore C. Masel, Glen Ellyn, and Joseph P. Miller, Hinsdale, Ill., assignors to General Motors Corporation, Detroit, Mich., a corporation of Delaware Application January 12, 1953, Serial No. 330,782

5 Claims. (Cl. 105—185)

This invention relates generally to railway vehicle trucks and more particularly to traction trucks for diesel locomotives.

The light trackage used by a few railroads in the United States and in many other countries has necessitated a reduction in the weight of diesel locomotives to be used on such light trackage. One part of the locomotive where the weight can be substantially reduced is in the locomotive trucks, and in fact many attempts have been made to lessen the weight of the trucks currently used. In the past, however, these attempts to reduce the weight of locomotive trucks have resulted in trucks having inferior riding qualities. This is usually explained by the fact that in order to reduce the weight of the truck, such items as hydraulic shock absorbers, complex resilient stops, spring plank assemblies, etc. have been omitted, all of which when present at least tend to increase the riding qualities of the truck.

It, therefore, broadly becomes an object of this invention to provide a locomotive truck whose weight is a minimum and yet whose construction is such that it has superior riding qualities.

It is a further object of this invention to provide a railway vehicle truck of light weight box-like flat sided sections which combine therewith a floating beam type bolster resiliently supported on self-centering coil springs, the bolster being acted upon by oppositely, diagonally disposed longitudinally facing friction dampers, all elements acting in combination to give a truck of light weight having superior riding qualities.

It is a further object of this invention to provide a locomotive truck of extremely simple construction having a beam-like bolster resiliently supported on the truck frame by a pair of self-centering helical coil springs, the beam-like bolster being acted upon by diagonally opposed friction snubbers which serve as take-up between the bolster and frame upon starting and also act to damp lateral and vertical movement of the truck bolster with respect to the truck frame.

It is another object of this invention to provide a four-wheel locomotive truck of extremely simple but rugged construction formed of box-like sections and having a beam type bolster resiliently supported on the truck frame by self-centering bolster springs seated on unique spring seats between transom members of the truck frame, friction snubbing means located on the truck transom members and acting on diagonally opposed longitudinally facing sides of the bolster to very slightly bias the bolster with respect to the truck frame members to aid in take-up between bolster and truck frame upon starting, and uniquely located lateral, longitudinal and vertical stop assemblies, all elements combining to give a truck of very light weight which also has very superior riding qualities.

The truck forming the subject of this invention will be more particularly described in conjunction with the accompanying figures in which.

Figure 1:
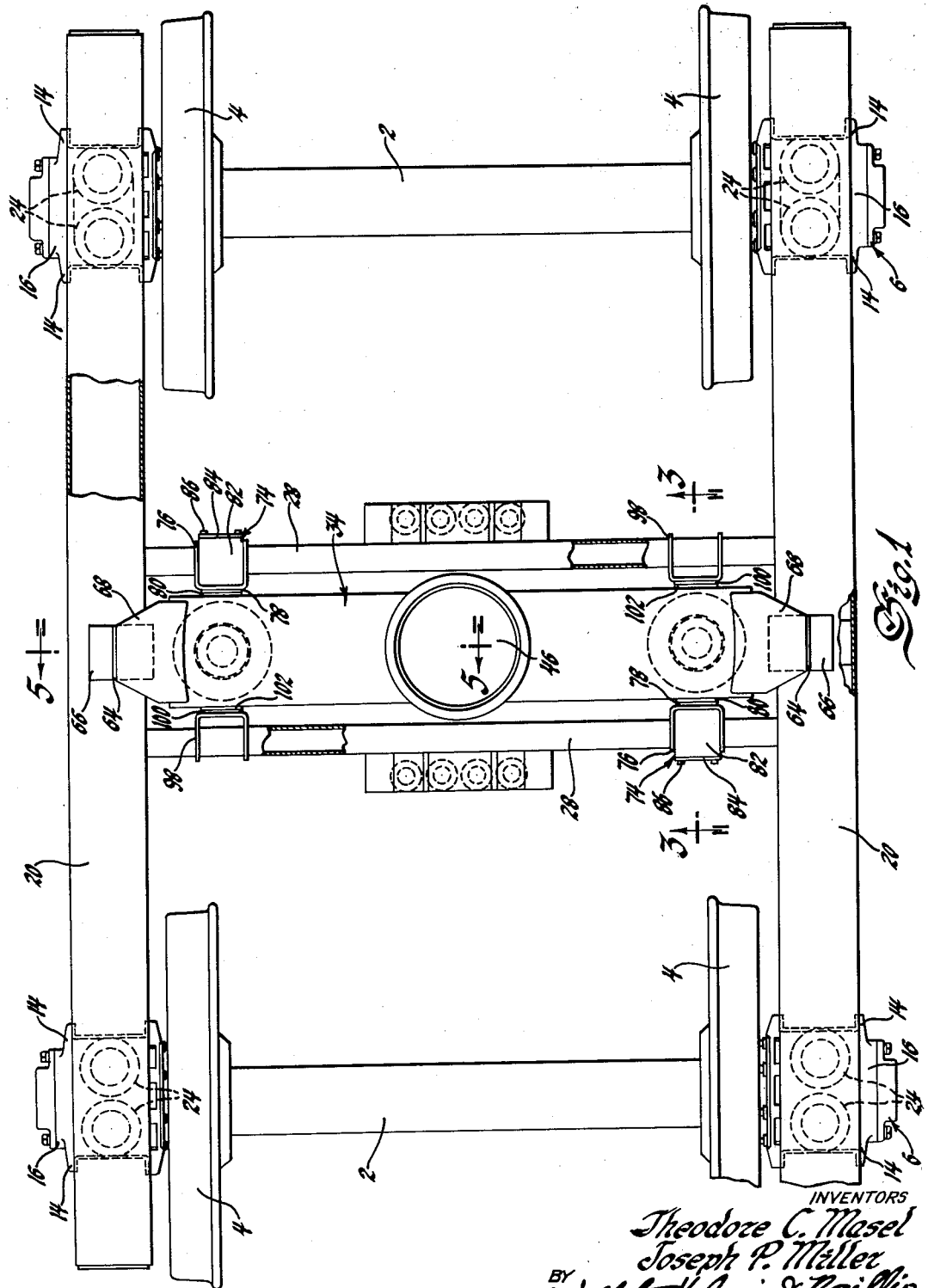
Figure 1 is a plan view of the truck showing the diagonally located friction snubbers and the simple box-like sections of the truck frame and bolster.
Figure 2:
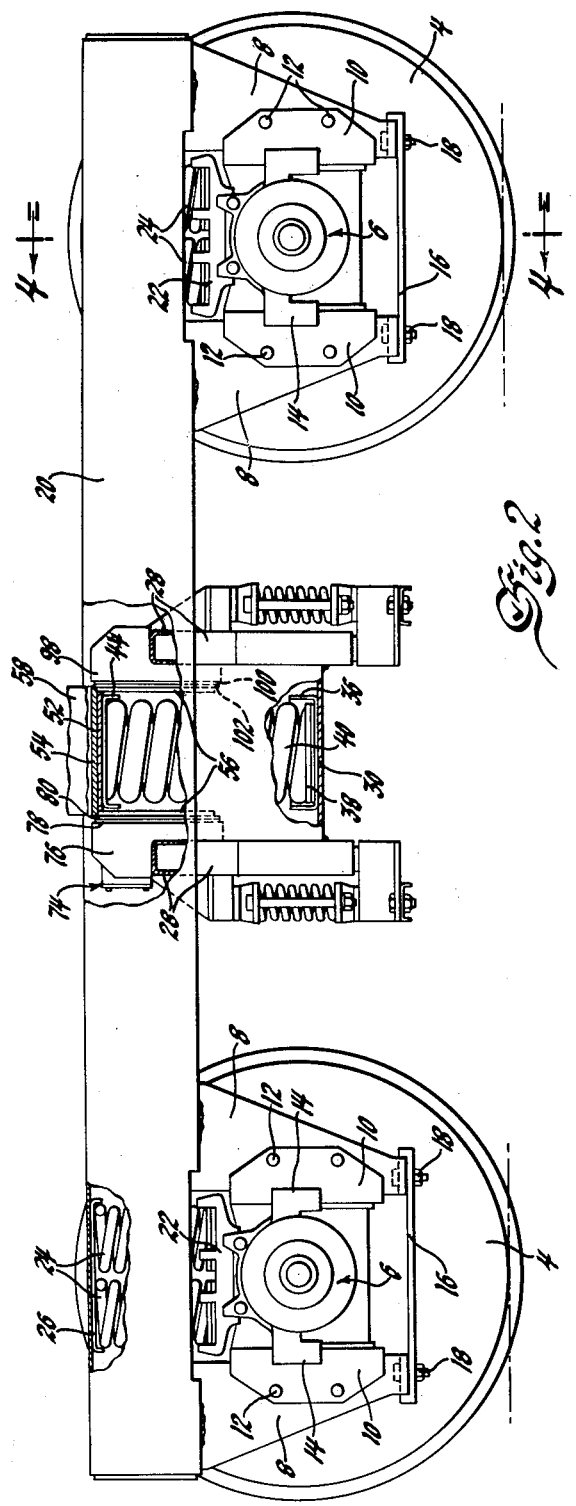
Figure 2 is a side elevation of the truck showing the flat sided box side frame members and the flat bent plate spring seats extending between transom members for resiliently supporting the bolster on the truck frame.

Referring now to Figures 1 and 2 the truck includes the usual axles 2 and wheels 4. Attached to the axles 2 are journal box assemblies 6 which are retained between pedestals 8 and pedestal liners 10 for limited vertical movement with respect thereto. The liners 10 are fastened to the pedestals by means of bolt assemblies 12 and are over-lapped by ears 14 forming part of the journal box assemblies 6 to prevent transverse movement of the axles and wheels with respect to the pedestals 8. The pedestals 8 are secured together at their lower ends by means of the pedestal straps 16 and the bolt assemblies 18. The pedestals 8 are preferably fabricated from preformed flat sections welded together; the upper ends of the pedestals then being welded to the longitudinally extending elongated box sections 20 which form the longitudinal members of the truck frame. The members 20 are also preferably fabricated from pre-formed flat sided plates welded together.

Figure 4:
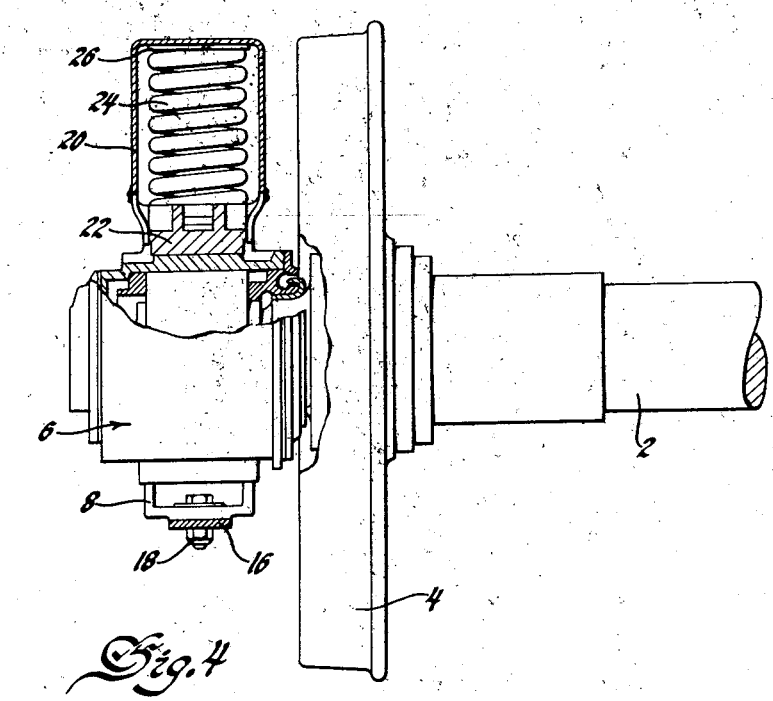
Figure 4 is a view taken along the line 4—4 of Figure 2 and shows the manner in which the box section side frame members are supported on the journal boxes of the truck.

Attention is now directed to Figure 4 which shows in detail how the box sections 20 may be resiliently supported on the journal box assemblies 6. As will be noted these resilient supporting means include spring seats 22 supported on the upper sides of the journal box assemblies 6, and the helical coil springs 24 extending into the box sections 20 and engaging the upper spring shims 26 secured to the underside of the upper plates of the elongated longitudinally extending box sections.

Figure 5:
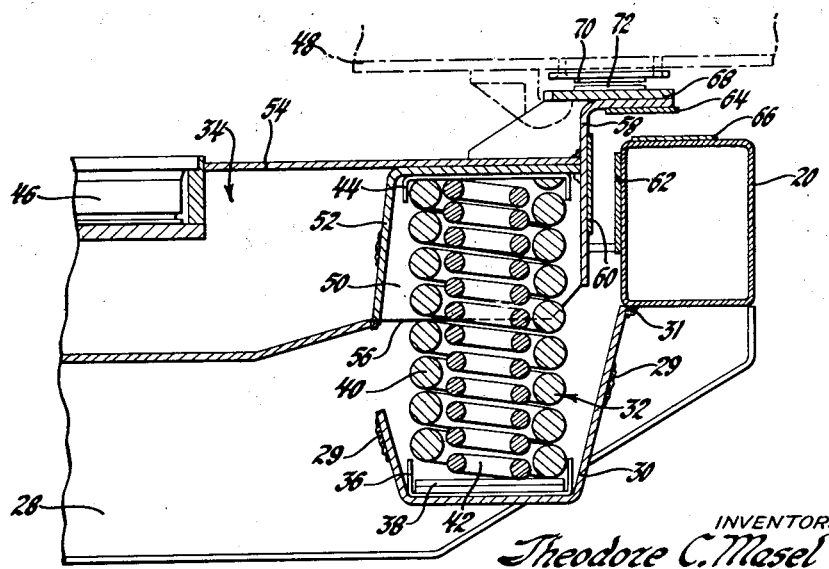
Figure 5 is a section taken on the line 5—5 of Figure 1 and shows in some detail the bent plate for resiliently supporting the bolster between the transom members of the truck as well as the uniquely located vertical and lateral stop assemblies acting between truck frame and bolster and locomotive body.

The elongated box sections 20 form the longitudinal strength members of the truck frame and, as best shown in Figures 1, 2 and 5, are maintained in parallel relationship by a pair of elongated transom members 28 extending transversely therebetween. The elongated transom members 28 which form the transverse strength members of the truck frame are also fabricated from pre-formed sections welded together into box sections and, preferably, are secured to the longitudinal box sections 20 by welding. Extending between the two transom members 28 and welded thereto, as shown at 29 and 31, are a pair of flat bent plates 30 of generally L-shaped configuration. These bent plates serve as spring seats on which the bolster spring assemblies 32 are seated to resiliently support a beam type bolster 34. The bolster spring assemblies 32 comprise retaining cups 36 secured to the horizontal portion of the bent plates 30, spring shims 38, helical coil springs 40 and 42, and an upper retaining cup 44 secured to the underside of the extremities of the bolster 34. The bolster 34 is also made up of pre-formed flat plates welded together and includes the usual recessed bearing plate assembly 46 which pivotally supports one end of the locomotive body 48. It will be noted that each end of the bolster 34 is provided with a downwardly facing pocket 50 in which the aforementioned upper retaining cup 44 is secured. The pockets 50 are partially formed by inverted L-shaped plates 52 welded to the upper bolster plates 54 and the bolster side plates 56. The outer walls of the pockets 50 are formed by a second set of inverted L-shaped plates 58 welded to the bolster side plates 56, the upper bolster plates 54, and plate 52.

Again referring to Figure 5 the simple but unique lateral and vertical stop assemblies acting between bolster and frame and bolster and locomotive body will be described. As has already been stated above, the outer walls of the spring pockets 50 are formed by welding inverted L-shaped plates 58 to bolster plate members 54 and 56. It will be noted, however, that if lateral outwardly facing chafing plates 60 are welded or secured to the vertical portions of plates 58 and chafing plates 62 are secured to the centers of the inwardly facing side walls of the longitudinal members 20 a simple but very effective lateral stop assembly is provided which acts upon extended lateral movement of the bolster 34 relative to the truck frame. The plate 58 may also be used to limit downward movement of the bolster 34 relative to the truck frame by providing chafing plates 64 and 66 on the undersides of the horizontal portions of plates 58 and the upper plates of longitudinal members 20 respectively. The upper sides of the horizontal portions of plates 58 may also be used in combination with plates 68 and chafing plates 70 and 72 to limit roll of the locomotive body 48 about its longitudinal axis relative to the bolster 34. This will become readily apparent when it is realized that plate 68 and chafing plate 72 are welded or otherwise secured to plate 58, and chafing plate 70 is secured to the underside of the locomotive body 48. It may now be appreciated that plate 58 due to its unique form and positioning acts in conjunction with the associated chafing plates to limit relative movement of the bolster in three respects, i. e. lateral movement relative to the truck frame, vertical movement relative to the truck frame, and rolling movement relative to the locomotive body.

Figure 3:
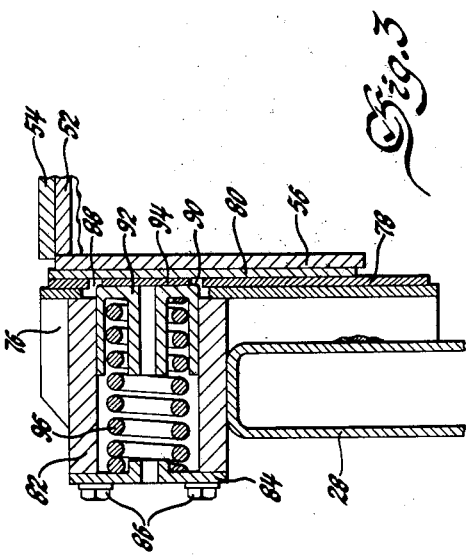
Figure 3 is a section taken on the line 3—3 of Figure 1 and enlarged to show the details of the longitudinally acting friction snubbers located on the transom members.

Another unique feature of this railway truck is the use of diagonally opposed longitudinally acting friction snubber assemblies 74 in combination with a floating beam-type bolster. As may be observed generally in Figures 1 and 2 and particularly in Figure 3, each of these assemblies includes a U-shaped member 76 welded or otherwise secured to a transom member 28. One surface of the member 76 is provided with a chafing plate 78 adapted to at times engage an associated chafing plate 80 secured to the bolster side plate 56. Positioned in the U-shaped member 76 and secured to the upper side of the transom member 28 is a plunger housing 82. The plunger housing 82 is provided with two open ends, one of which is normally closed by a spring bearing plate 84 and bolt assemblies 86. The other end is aligned with openings 88 and 90 in the member 76 and chafing plate 78 respectively. Slidably retained in the housing 82 is a plunger 92 having a friction plate 94 attached thereto. The plunger 92 and the friction plate 94 are urged against the associated chafing plate 80 secured on the bolster side plate 56 by a small coil spring 96 acting against the spring bearing plate 84.

As seen in Figures 1 and 2 a second pair of diagonally opposed U-shaped members 98 are provided which also have chafing plates 100 attached thereto. The chafing plates 100 are adapted to at times engage associated chafing plates 102 on the bolster side plates 56 and cooperate with the assemblies 74 to transmit longitudinal movement between bolster and frame. As may be observed, however, no spring load plungers are provided in the U-shaped members 98 to act against chafing plates 102.

It may now be appreciated that the diagonally opposed friction assemblies 74 will tend to very slightly bias the bolster with respect to the truck frame. This biasing reduces the clearance between longitudinal bolster and frame chafing plates and thereby reduces the sudden shock normally experienced by other locomotive trucks on starting. This shock in the past has been especially bad in trucks using beam type bolsters and may be explained by the fact that the bolster in other constructions had a tendency to "roll" when starting.

The final feature of this new railway truck which should again be emphasized is the manner in which the bolster is resiliently supported on the truck frame. As has already been explained the ends of the bolster springs 40 and 42 are held captive in the retaining cups 36 and 44. Therefore, as the bolster 34 is moved away from its centered position, these springs must assume distorted S-shapes which tend to restore the bolster to its centered position. The friction assemblies 74 act to prevent any serious harmonic action on the part of the springs 40 and 42.

A unique railway vehicle truck has just been described whose elements combine to give a railway vehicle truck of light weight having the superior riding qualities formerly associated with much heavier trucks employing expensive and space-using equipment.

We claim:

1. A railway vehicle truck comprising a pair of longitudinally extending side frame members resiliently supported on sets of rotatable axles and wheels, a pair of transom members extending between said side frame members and attached thereto, a pair of spring seat members formed from plates extending longitudinally between said transom members and positioned adjacent said side frame members, an elongated bolster of rectangular box section, a plurality of helical coil springs interposed between said bolster and said spring seat members and resiliently supporting said bolster on said spring seat members, and diagonally located spring loaded plungers mounted on said transom members and acting only on diagonally located points on opposite sides of said bolster to bias said bolster with respect to said frame members to reduce shock between bolster and frame which may occur after certain relative movement therebetween.

2. A railway vehicle truck comprising a truck frame resiliently supported on rotatable wheels and axles, said frame including longitudinally and transversely extending members of flat sided box sections, means forming flat plate spring seats on said frame, a truck bolster of flat sided box section whose extremities are resiliently supported on bolster centering helical springs interposed between said bolster and the spring seats on said frame, resilient friction means on said transversely extending sections acting only on diagonally located points on opposite sides of said bolster to apply a turning moment to said bolster with respect to said frame members and transmit longitudinal movement therebetween, said means also acting to damp harmonic action of said bolster centering springs.

3. A locomotive truck for supporting one end of a locomotive body and comprising a truck frame including longitudinal side frame members supported by rotatable axles and wheels, a floating bolster on which said end is supported, downwardly opening pockets in the extremities of said bolster and including outer walls, resilient means mounted on said frame and engageable in said pockets to support said bolster on said frame, and portions on said outer walls extending over said side frame members below said locomotive body and adapted to abut said body and said frame for predetermined vertical movements of said portions relative to said body and frame to limit vertical movement of the extremities of said bolster relative to said body and said frame.

4. A locomotive truck for pivotally supporting one end of a locomotive body and comprising a truck frame including longitudinal side frame members supported by rotatable axles and wheels, a floating beam bolster fabricated from flat plates secured together and on which said end is supported, downwardly opening pockets fabricated in the extremities of said bolster and including outer walls, resilient means mounted on said frame and engageable in said pockets to support said bolster on said frame, bent plates substantially vertical portions of which form said outer walls of said pockets, the latter of said plates being bent to also form substantially horizontal portions extending over said side frames below said locomotive body, said portions being abuttable with said side frames and said body after predetermined vertical movements of said extremities relative to said side frames and body to limit vertical movement of the extremities of said bolster relative to said body and said frame.

5. A locomotive truck for supporting one end of a locomotive body and comprising a truck frame including longitudinal side frame members of rectangular box section supported by rotatable axles and wheels, a floating bolster on which said end is supported, downwardly opening pockets fabricated in the extremities of said bolster and including outer walls, resilient means mounted on said frame and engageable in said pockets to support said bolster on said frame, and L-shaped plates having substantially vertical legs which form said outer walls of said pockets, said L-shaped plates having outwardly extending horizontal legs located above that part of the bolster intermediate the ends thereof and extending outwardly over said frames below said locomotive body, said horizontal legs having oppositely disposed surfaces thereon engageable with the underside of said body and the upper surfaces of said side frame members upon extended vertical movement of said bolster relative to said body and frame to limit said movement, said vertical legs having outwardly facing surfaces thereon engageable with inwardly facing surfaces on said side frame members upon extended lateral movement of said bolster relative to said frame to limit said latter movement.

References Cited in the file of this patent
UNITED STATES PATENTS

| | | |
|---|---|---|
| 1,130,665 | Bullock | Mar. 2, 1915 |
| 1,916,152 | Hedgecock | June 27, 1933 |
| 2,167,125 | Pflager | July 25, 1939 |
| 2,232,111 | Haessler | Feb. 18, 1941 |
| 2,255,489 | Kjolseth | Sept. 9, 1941 |
| 2,313,740 | Eksergian | Mar. 16, 1943 |
| 2,317,398 | Nystrom | Apr. 27, 1943 |
| 2,324,943 | Miller | July 20, 1943 |
| 2,386,577 | Statler | Oct. 9, 1945 |
| 2,492,337 | Travilla | Dec. 27, 1949 |
| 2,560,272 | Boswell | July 10, 1951 |
| 2,703,056 | Blomberg | Mar. 1, 1955 |